3,036,015
BITUMEN-IN-WATER EMULSIONS

Eugene E. Woodward, Shiprock, N. Mex., assignor to Kerr-McGee Oil Industries, Incorporated, a corporation of Delaware
No Drawing. Filed Oct. 17, 1955, Ser. No. 541,026
10 Claims. (Cl. 252—311.5)

This invention relates to new and useful bitumen-in-water emulsions and to the process of preparing these emulsions. More particularly this invention relates to asphalt-in-water type emulsions, the preferred internal phase being petroleum resins.

This is a continuation-in-part of application Serial No. 448,158, filed August 5, 1954, now abandoned.

Examples of bitumen comprises various products derived from petroleum by refining such as lubricating oils, reduced crude oils, asphalt, cracked tars, asphaltenes, resins, asphaltic oils and those naturally occurring asphalts (bitumen and pyrobitumens) or products obtained by blowing these materials with oxygen containing gas in the presence or absence of a catalyst. Examples of naturally occurring asphalts comprise gilsonite, grahamite, wurtzlite and native asphalts.

There are a number of references in the prior art relating to the preparation of a bitumen-in-water emulsion using rosin oil soaps or higher fatty acid soaps as emulsifying agents. One of the primary uses for such emulsions is in road surfacing. Such emulsions are recognized as having one or more undesirable characteristics. As examples of these undesirable characteristics, there may be mentioned poor storage properties (especially in metal containers), poor weather and mechanical stability, low chemical stability and a tendency to strip from certain aggregates of an acid nature. In order to overcome these inherent undesirable characteristics, many stabilizing, anti-freezing and anti-stripping agents have been developed by the prior art. Examples of such agents include clay, alcohol, phenols, sugars and other carbohydrates. Such materials are additive agents and are used in varying proportions to overcome the undesirable limitations of these emulsions and produce the so-called road oil emulsions.

When these road oil type emulsions are used for sizing paper or water proofing cellulosic material, it is found that the coarseness of the particle size of the internal phase causes plugging of the papermaking equipment and obtains a product with dark spots on its surface which tends to be sticky or tacky. Similarly when the road oil type emulsion is used as a paint for light protective coating of metallic or cellulosic objects, a blotchy and generally undesirable appearance is obtained because of the coarse particle size. Since these poor results were attributed to coarse particle size the art has endeavored to prepare finer particle size emulsions.

U.S. Patent 2,481,374 illustrates a method of making improved smaller average particle size asphalt emulsions. However, these emulsions have one very undesirable feature, i.e., unless they have been set with a sizing aid, such as papermaker's alum, the bituminous residues obtained on the paper are readily water re-emulsifiable or water leachable. It will be apparent to those skilled in the art that it would be advantageous to size paper without the need of a sizing aid with attendant close control of the pH of sizing providing the resulting size is not water leachable or water re-emulsifiable.

U.S. Patent 2,502,080 illustrates another method of preparing improved smaller particle size emulsions. This patent employs wood rosin and petroleum resin to prepare what is called either a fine solution or a dispersion containing no particles larger than 0.1 micron. The wood rosin is present in the emulsion as a mixture of 10–40% free rosin acid and at least 10% as the alkali rosin soap. When the percentage petroleum resin exceeds 50% (on the dry basis) and the free rosin becomes less than 10%, the let down emulsions are cloudy dispersions having observable particles of a size greater than 0.1 micron. Furthermore these let down emulsions lose their ability to size paper when they are stored for any appreciable time. Another disadvantage of these emulsions is they require the use of a setting aid such as papermaker's alum to cause the asphalt to become firmly attached to the cellulosic fibers.

Accordingly it is an object of my invention to provide new and improved bitumen-in-water emulsions which are characterized by a very fine average particle size.

It is a further object of the present invention to provide new and improved bitumen-in-water emulsions of small average particle size which do not cream in either concentrated or let down condition and are resistant to metal container storage conditions.

Still another object of the present invention is to provide an improved bitumen-in-water type emulsion of small average particle size which is capable of sizing cellulosic materials to obtain improved water resistant properties even in the absence of a setting aid.

Another important object of the present invention is to provide a process for producing improved bitumen-in-water type emulsions of small average particle size, the process being characterized by the use of a minimum amount of emulsifying agent to obtain the desired small average particle size.

Another important object of the present invention is to provide an improved asphalt emulsion, characterized by the ability to size a cellulosic material to obtain improved water resistance properties even in the absence of a setting aid, resistance to metal container storage conditions, and an ability to be diluted to all concentrations without creaming, the preferred internal phase constitutent being petroleum resins.

These and other objects will become more apparent from the following description of my invention.

I have discovered that highly stable bitumen-in-water emulsions may be prepared with the aid of organic emulsifying agents of the type promoting oil-in-water emulsions to obtain an average particle size of less than 2 microns in diameter, preferably 0.5–1 micron or smaller with substantially no particles greater than 6 microns providing the emulsification operation is carried out in accordance with the method to be described hereinafter. It will be appreciated that there are certain preferred procedural steps embodied in this method and that preferred emulsions are obtained when these preferred procedural steps are carried out. The highly stable bitumen-in-water emulsions of this invention are characterized by the unexpected ability to size cellulosic products even without the use of a setting aid, the ability to be diluted or let down to all strengths without creaming, and exceptional stability upon storing (especially in metal containers) regardless of the degree of dilution. As a result of these and other characteristics, the emulsions of the present invention may be used in the preparation of binders, adhesives, coatings, fillers, plasticizers, soil stabilizers, sound deadeners, polishes, sized paper and the like. In addition the emulsions of my invention are particularly suitable for sizing alkaline filled cellulosic products where dark color is not objectionable.

It is an essential condition of the process of my invention that during emulsification the phase volume ratio for the bitumen-in-water system be continuously maintained within the range yielding substantially a maximum viscosity at the temperature of emulsification. For example, if the bitumen is a petroleum resin, a viscosity of at least 50,000 centipoises is required when using non-pressurized equipment or colloid mills at room temperature whereas at a temperature of 180–190° F., it will be of the order of 3,000 to 10,000 centipoises and higher. If this condition is not met, the average particle size of the emulsion will be greater than 2 microns.

The highly stable bitumen-in-water emulsions of the present invention may be prepared by a continuous method of controlled and simultaneous addition of the bitumen and water phases or by separate and incremental addition of the two phases. Both methods maintain the phase volume ratio for the bitumen-in-water system within the range yielding substantially a maximum viscosity at the temperature of emulsification.

A continuous commercial method of making applicant's emulsion comprises incorporating the emulsifying agent in the water preferably continuously, but it may be added batchwise to the water before its use. To start up operation, the water containing the emulsifier is allowed to flow through a colloid mill at substantially less than half the mill's capacity. Then the fluid bitumen is fed to the colloid mill, the rate of feed of bitumen being increased, as long as the viscosity of the emulsion from the mill is increasing. At a certain bitumen to water ratio, the emulsion viscosity will decrease and in fact, if the rate of increase in bitumen feed is too great, the emulsion may even reverse. If the emulsion is reversed, preferably the bitumen feed rate should be decreased or, alternatively, the feed rate of water containing emulsifier may be increased until that bitumen to water ratio is reached to give a bitumen-in-water emulsion having substantially a maximum viscosity. The point where the emulsion viscosity no longer increases is the incipient reversal point and the emulsion will have substantially its maximum viscosity at this point for its temperature. Once the rate of feed of water and bitumen is adjusted to those portions giving substantially a maximum viscosity for the temperature of emulsification, the feed rates are maintained constant to produce applicant's type emulsion.

If the rate of emulsion preparation is too slow, it may be increased by increasing the water feed rate and simultaneously increasing the bitumen feed rate to maintain the critical phase volume ratio which gives an emulsion of substantially a maximum viscosity for the emulsification temperature.

The continuous method of preparing the emulsion of the invention may be thought of as being a process wherein a preformed emulsion which constitutes a small fractional portion of the total emulsion is produced by emulsifying minor proportions of the constituents of the emulsion to obtain a viscosity of substantially the maximum obtainable for the bitumen-water system at the temperature of emulsification. A stream of the preformed emulsion is created and bitumen and water continuously introduced into the stream at a rate to continuously maintain the phase volume ratio within the range yielding substantially a maximum viscosity for the system at its temperature. Turbulence is effected in the stream, emulsifying agent is supplied to the stream prior to effecting turbulence, and a portion of the emulsion stream is continuously withdrawn subsequent to turbulence and the remainder is circulated as fresh preformed emulsion stream.

The emulsion made during start-up of operations or at other times, which does not conform to my invention may be recycled to mill and thereby the loss of raw materials in off-grade product alleviated. The recycling of emulsion is not limited to reclaiming of off-grade emulsion. In fact, when it is desired to make my emulsions having extremely low percentages of emulsifier, i.e., less than 2%, in the final emulsion, recycle may be used to advantage.

If a colloid mill or similar equipment for continuous processing is not available, the emulsion of this invention may be prepared by forming a small amount of preformed emulsion having substantially a maximum viscosity at its temperature of emulsification. The preformed emulsion is preferably formed by adding with agitation fluid bitumen to a small amount of water containing up to 50% emulsifier or higher. The more emulsifier used the easier it is to obtain the desired preformed emulsion. The addition of fluid bitumen is continued as long as the viscosity of the emulsion increases. When a certain phase volume ratio of bitumen to water is exceeded, the viscosity of the emulsion will decrease slightly and if addition of fluid bitumen is continued without further additions of water, the emulsion will invert to give a water-in-oil emulsion.

Therefore, at the point where the viscosity of the emulsion first shows a decrease in value, alternate additions of water and fluid bitumen should be resorted to. The ratio of additions of water to bitumen should be such as to maintain the phase volume ratio in those proportions where the first decrease in viscosity occurs.

The water added by alternate additions may or may not contain emulsifier. The necessity for emulsifier in the water is determined by the amount present in the preformed emulsion, the percent emulsifier desired in the finished emulsion and the smallest amount of emulsifier necessary to effectively emulsify the bitumen. The smallest amount of emulsifier which will effectively emulsify bitumen in my invention is approximately 0.5% by weight based on the total emulsion weight. The minimum amount of emulsifier is to a certain extent a function of the particular emulsifier being used.

I have obtained by the preformed emulsion embodiment, illustrated above, bitumen-in-water emulsions having substantially a maximum viscosity at its temperature of emulsification and an average particle size of less than 1 micron wherein the emulsifying agent was present in as little as 3% by weight.

The solid bituminous materials of the instant invention are those having ring and ball softening points (ASTM Test D 36–26) too soft to determine to 400° F. and will vary from tacky, black glossy materials to non-tacky, friable ones. Those bituminous materials most preferred for use as cellulosic sizes will have ring and ball softening points of 125–200° F. and penetrations at 77° F. (ASTM Test D 5–25) of 0 to 30. It has been found desirable when using bitumens of 140° F. or greater softening point to either cut the bitumen back with a suitable solvent to obtain a working fluidity at the desired temperature or resort to pressurized emulsification. The inclusion of the solvent in no way affects the ultimate use of the finished emulsion, as the solvent is volatilized during the drying operations incident to the use of these emulsions. When the term "bitumen" is used in the claims or a specific bitumen is claimed, it is assumed that if its softening point is too high for a proper working fluidity that either the bitumen has been cut back with a suitable solvent or pressurized emulsification has been employed or both.

Since the preferred bitumens, petroleum resins, have softening points in the range of 150 to 180° F. and penetrations in the range of from 0 to 5 at 77° F., it is desirable to emulsify the petroleum resin in water at the highest practical temperature to prevent the petroleum resin from congealing too fast. Practical temperature limitations are somewhat governed by the selection of solvent used for cutting back the petroleum resins.

Among the many satisfactory volatile-type solvents that may be used are kerosene, gasoline, high-flash naphtha solvents, aromatic solvents, etc. Mineral spirits, an essentially non-aromatic material, is a preferred volatile-type solvent since it possesses a high flash point and a relatively narrow boiling range. The high flash point offers a safety feature and the boiling range of from approximately 300 to 400° F. permits easy evaporation of the solvent when the emulsions of the present invention are used.

Among the many satisfactory non-volatile-type solvents useful for the purposes of the invention are the normally non-volatile solvents such as either straight-run or cracked heavy distillates. Specific examples of such solvents include cat-cracker recycle and gas oils, and lubricating stocks. Emulsions containing the non-volatile solvents are preferred in some instances, for example in the sizing of paper, where it is usually desirable for the non-volatile solvent to be retained as an integral part of solids deposited on the paper.

Another reason for employing cutback bitumens such as petroleum resins or asphalts is for ease of handling. By cutting back a petroleum resin with a solvent, its viscosity is lowered, thereby facilitating its incorporation into the water emulsion without boiling the water.

The ability of a solvent to lower the viscosity of a particular bitumen over a particular temperature range is influenced to a degree by the viscosity characteristic with change in temperature exhibited by this solvent. For example, a highly paraffinic solvent would give a smaller change in viscosity with temperature than an aromatic type solvent. Therefore, the viscosity effect on the cutback bitumen at a particular temperature is a function of the percent bitumen and cutback present in the mixture and their respective natures.

The solvent apparently serves to help adjust the hydrophilic and hydrophobic nature of the emulsifier by increasing or decreasing the relative solubility of the emulsifier in the cutback bitumen. As an illustration, "Vinsol" (the petroleum (paraffinic) insoluble product derived from pine wood and identified by its manufacturer, Hercules Powder Company, as a polymerized abietic acid containing appreciable phenolic content) is essentially insoluble in mineral spirits but has appreciable solubility in a very high aromatic solvent, such as fortified aromatic spirits. Therefore, if "Vinsol" soaps are used as emulsifying agents, aromatic type cutbacks will tend to facilitate the ease of production of bitumen-in-water type emulsions while non-aromatic type solvents will tend to cause water-in-oil emulsions to be formed.

Another means of varying the balance between the hydrophilic and hydrophobic groups of an emulsifier is to change the nature of the basic constituent which reacts with the acidic portion. To illustrate this concept, if potassium is substituted for sodium in the soap of stearic acid, I have found that potassium stearate is more amenable to my method of emulsification than sodium stearate. I believe this is due to the better balance between the hydrophilic and hydrophobic groups of the emulsifying agent which has the effect of permitting a greater variation in the bitumen to water phase volume ratio in the zone of emulsification near the incipient reversal point. With an emulsifying agent which I prefer to refer to as having a proper balance between the hydrophilic and hydrophobic groups, I find it relatively easy to adjust the phase volume ratio to maintain a substantially maximum viscosity near the incipient reversal point. With an emulsifying agent which has poor balance between the hydrophobic and hydrophilic groups, the phase volume ratio is so critical that the task of maintaining a substantially maximum viscosity near the incipient reversal point becomes extremely difficult, and in some cases almost impossible. The difference in ease of effecting emulsification in the zone near incipient reversal between a proper and a poorly balanced emulsifying agent is such as to lead me to believe there is a plateau effect with the properly balanced emulsifier and a peak effect with the poorly balanced one. Otherwise, I am unable to explain the apparent difference in sensitivity to change in phase volume ratio near the incipient reversal point.

The maximum viscosity obtainable in accordance with the method of my invention varies with temperature. For example when the emulsification occurs at 120° F. with the formulation of Example III, the maximum viscosity is in the neighborhood of 50,000 centipoises while if emulsification occurs at 190° F. the maximum viscosity would be of the order of 3,000 to 10,000 centipoises and higher. I have found that if the emulsions prepared at 190° F. are allowed to cool to room temperature the viscosity will be in the neighborhood of 50,000 centipoises (extrapolation indicates values up to 500,000 centipoises may be obtained at 80 to 90° F. in some cases).

It might be added that various emulsifiers have a tendency to affect the viscosity of the external phase (water). By way of example, a sodium and a potassium stearate water solution of the same percentage soap can be a solid to a semi-fluid as sodium appears to cause a gel to form at lower concentrations than potassium.

The organic emulsifiers of the instant invention are the ones known in the art as promoters of oil-in-water emulsions such as water soluble soaps of the fatty acids or fatty acid mixtures or their glycerides. Examples of fatty acids, include oleic, palmitic, stearic, lauric, naphthenic, oxidized higher hydrocarbons (waxes) containing carboxylic groups, tall oil, rosin acid (primarily abietic acid or its derivatives) and mixtures thereof. The water soluble alkali metal soaps of rosin and tall oil are preferred from the standpoint of economy. The above emulsifiers and the water soluble organic salt emulsifiers described below may be referred to in the claims as being water soluble non-sulfo, detergent-forming, monocarboxy acid soaps.

The water soluble organic salt type emulsifiers useful in the practice of this invention are prepared by reacting the fatty acids, i.e., either the acid or its glyceride with a basic substance including alkalis and lower organic amines having less than 6 carbon atoms in the chain. The alkalis suitable for forming water soluble soaps are sodium, potassium and ammonium. Examples of suitable organic amines include ethanol amine, morpholine and ethyl amine. The alkali oxides, hydroxides and carbonates may be used instead of the higher priced metal. The preferred basic material for forming water soluble soaps useful as emulsifiers in this invention is sodium hydroxide. This preference is primarily of an economic nature for it would not be preferred in case of the stearic acid soap already referred to, as potassium is better in this case. When ammonium soaps are used, an excess of free ammonia or ammonium hydroxide is normally used because of the pronounced tendency of ammonia to be volatilized during the emulsification process.

Certain organic bodying agents such as the cellulose derivatives, proteinaceous matter, and certain natural gums may be used in conjunction with this invention to aid in achieving high initial viscosity by increasing the viscosity of the external phase. Also, if it is desired to compensate for decrease in viscosity with increased temperature of the water during emulsification, bodying agents may be used to increase the viscosity of the external phase and thereby aid in obtaining the maximum viscosity during emulsification.

A preferred formulation for the production of emulsions according to the present invention is as follows:

|  | Percent |
|---|---|
| Bitumen or a constituent thereof | 40–60 |
| Solvent (cutback) | 0–20 |
| Emulsifying agent | 0.5–8 |
| Water | 30–40 |

This is not intended to preclude the use of higher percentages of emulsifying agent or of solvent. As much as 20% by weight and higher of a water soluble fatty acid soap or a water soluble alkali organic sulfonate will form satisfactory emulsions. Higher percentages by weight of solvent may be desirable if the bitumen is of an extremely viscous nature. For example, when emulsifying asphaltenes having a softening point of about 300° F., or higher, it is generally preferred to use a formulation comprising 30 to 50% solvent, and in some cases up to 70% solvent, in order to reduce the extremely high viscosity. In such instances, the percentage by weight of the remaining components in the formulation are reduced in the ratio given for the above preferred formulation.

An example of a typical emulsion as prepared according to the foregoing formulation is as follows:

Example I

| | Lbs. |
|---|---|
| Petroleum resin, S.P. 198° F | 42.9 |
| Mineral spirits | 21.4 |
| Refined tall oil | 3.2 |
| Caustic soda | 0.3 |
| Water | 32.2 |

The tall oil is placed in a mixing vessel of 80 quarts capacity and slowly stirred. The caustic soda is dissolved in 4.8 pounds of water and added to the tall oil. No heat is supplied other than the heat of reaction itself, which is sufficient to raise the temperature of the mass to 160–180° F. At the end of a half hour, the reaction is essentially complete, a neutral sodium soap of tall oil, or sodium tallate, having been produced.

The petroleum resin is heated to 400° F., and to this material is slowly added with stirring the mineral spirits of 300–400° F. boiling range. The resultant mixture will have a temperature of 300° F. which must be maintained during addition of the cutback resin to the body of the emulsion.

The petroleum resin mixture is now slowly added to the tall oil soap with vigorous agitation. The mixer (a conventional bakery mixer may be used) should be capable of developing high torque at low speed, and should be so designed that it will sweep the entire mixing area of the vessel. The resin will be incorporated in the soap to form an oil-in-water type of emulsion. Initially the viscosity of the mixture will increase upon addition of the resin, but after the addition of a portion of the resin, usually one-quarter to one-third of the total resin to be added, the viscosity will show a tendency to decrease, indicating a tendency toward incipient reversal of the mixture to form a water-in-oil type emulsion. It is this emulsion which contains a fractional portion of the total bitumen to be emulsified and which is at substantially a maximum viscosity for the system at its temperature that I refer to in the claims as being a "preformed emulsion." At this point it is necessary to begin the incremental addition of water preferably at ambient temperature. The water will accomplish two things: prevent the undesirable reversal of the emulsion, and maintain the viscosity of the mixture at substantially the highest point. Maintaining the mixture at substantially its maximum viscosity at its temperature of emulsification is essential to produce the fine particle size of the instant invention. In this example, the water, at the rate of 1 lb. water to 2.3 pounds cutback resin, may be added either alternately with the resin or simultaneously to maintain the necessary high viscosity. Visual observation of the mass is perhaps the best way of determining its viscosity, since the viscous mixture has the consistency of a very heavy paste, and any decrease in its viscosity can be readily observed. The operator is cautioned not to add too much water at this point as this will have an ultimate thinning effect due simply to the increase in volume of the external phase of the emulsion. The ratio of water to the resin-solvent mixture that must be added during the preparation of an emulsion is a critical property of each particular system, and must be determined for each different formulation, but ordinarily will be about one pound of water to each two to four pounds of resin-solvent mixture depending on the temperature of emulsification.

After all the resin has been incorporated in the mixture, the emulsification is completed, and additional water may be added if it is desired to meet specifications of customers requiring an emulsion of lower solid content. The thinning may be enhanced by the addition of small amounts of surface active agents. A let-down emulsion having a final resin-solvent to water ratio in the range of 6:4 to 4:6 results in a mixture possessing good stability characteristics on standing, a workable consistency, and a sufficiently high concentration of resin to make economically feasible the shipment of the finished product over long distances.

During the batch preparation of the emulsion, the temperature will stay in the range of 120–130° F. No outside source of heat is necessary during the mixing, since the resin-solvent mixture will be added at 300° F.

The finished emulsion will have a particle size in the microscopically observable range of 0.1 to 2.0 microns, with 95% of the observable particles less than 1.0 micron and substantially no particles larger than 6 microns with 99° of particles under 4 microns.

Example II

As a modification of the batch emulsification method of Example I, the emulsifier may be prepared in situ by the nascent soap method. When using the nascent soap method of preparing emulsifier, for example, the tall oil is dissolved in a portion of the fluid bitumen and then soap is formed in situ by addition of the aqueous alkali. As the in situ preparation of a soap progresses the bitumen in turn is emulsified. After the preformed emulsion is obtained the operation is similar to that illustrated in Example I.

Example III

A chemicolloid pilot plant colloid mill driven by a 1 H.P., 3600 r.p.m., 220 volt, 3 phase motor was used in production of emulsion by my preferred continuous once through emulsification process. To start the emulsification, a 45% sodium tallate solution was fed at a rate of 5 to 20 lbs. per hour to the colloid mill depending on the rate of production of emulsion desired. Then the fluid bitumen was fed to the mill at a rate of 50 lbs. per hour.

The soapy water and fluid bitumen were injected into a common line a short time before they entered the mill. The emulsion coming from the mill at this point was very fluid. The rate of feed of fluid bitumen was gradually increased, thereby changing the phase volume ratio of bitumen to water. This had the effect of increasing the viscosity of the emulsion. The rate of feed of fluid bitumen was continually increased as long as the viscosity of the emulsion from the mill increased, but a point was reached as feed rate of bitumen approached 150 lbs. per hour where the viscosity of the emulsion began to thin. This indicated incipient reversal of phases or in some cases complete reversal. At this point, the feed rate of bitumen was decreased until the phase volume ratios were approximately the same as those where initial drop in viscosity occurred. Adjustments of the feed rates of bitumen and water were made to give an emulsion of substantially a maximum viscosity having an average particle size of less than 1 and none greater than 6 microns in diameter. I also have started the continuous emulsification process by starting bitumen feed first and then water and increasing water to give my emulsion.

By the above process, emulsions of substantially a maximum viscosity for the temperature of emulsification have been produced wherein the percent emulsifier and water, in the emulsion from mill were deliberately varied from 3.8 to 8.9 and 4.6 to 11.0 respectively. The particles of said emulsions are very uniform, having an average range of diameters less than ½ micron and few particles greater than 1 micron. The process may be modified so as to recycle at least a portion of the emulsion. This modification is desirable in reclaiming off-grade emulsion produced when starting the emulsification process, and will also allow more convenient operation when less than about 3% emulsifier is used.

If it is undesirable to incorporate a solvent in the mixture when working with high softening point materials, the above procedure may be varied by operating the colloid mill under pressures of, for example, 100 p.s.i.g. This allows the resin to be heated to temperatures such that it possesses the proper fluidity characteristics and yet will not permit boiling of the water phase in the colloid mill. In such a pressurized system, it is necessary to allow the finished material to cool under pressure to a temperature well below the boiling point of water, preferably 140° F. For purposes of controlling the viscosity, a viscosimeter of the Ultra-Viscoson type can be installed in the flow line leading from the colloid mill to the pressurized reservoir.

Another example of a satisfactory petroleum resin emulsion is as follows:

*Example IV*

|   | Lbs. |
|---|---|
| Petroleum resin, S.P. 123° F | 52.5 |
| Unrefined tall oil | 4.0 |
| Caustic soda | 0.4 |
| Water | 43.1 |

In this example, the resin is of such a softening point that it need not be cut back with solvent prior to its emulsification. The resin is heated to 300° F. and maintained at this temperature during addition to the body of the emulsion. Once again it must be emphasized that after the initial addition of the hot resin, when the viscosity of the mixture has reached its maximum, i.e., during formation of the "preformed emulsion," it is necessary to maintain this maximum viscosity by the carefully regulated simultaneous or alternate addition of water and resin. In the instance of this example, 1 pound of water per 2.5 pounds of resin has been found to be the optimum for the production of smallest particles size after the "preformed" emulsion is obtained. When prepared in the batch kettle, the particle size of the finished emulsion by this formulation is 95% less than one micron with 99% of particles less than 4 microns and substantially no particles greater than 6 microns.

Other satisfactory formulae for petroleum resin emulsions are shown by the following examples, the temperature of emulsification being 120–130° F. and the proportions being in pounds.

|  | Example No. |  |  |  |  |  |
|---|---|---|---|---|---|---|
|  | V | VI | VII | VIII | IX | X |
| Petroleum Resin, S.P. 178° F | 200 | 200 | 200 | 200 | 200 | 200 |
| Ammonium Oleate (75% water) |  |  |  |  |  | 80 |
| Sodium Oleate (75% water) | 80 | 56 |  |  |  |  |
| Potassium Oleate (75% water) |  |  |  | 80 |  |  |
| Sodium Rosinate (50% water) |  |  | 40 |  |  |  |
| Potassium Rosinate (50% water) |  |  |  |  | 40 |  |
| Mineral Spirits | 66 | 66 | 66 | 66 | 66 | 66 |
| Water | 100 | 100 | 100 | 100 | 100 | 100 |

The process of this invention was used with the following formulations to produce bitumen-in-water emulsion having particles of 0.5–1 micron or less with substantially no particles greater than 2 microns.

|  | Example No. |  |  |  |  |
|---|---|---|---|---|---|
|  | XI | XII | XIII | XIV | XV |
| Asphaltenes—320° F., S.P. |  |  |  | 200 |  |
| Blown Asphalt, 171° F., S.P. | 300 |  |  |  |  |
| Asphalt, Vacuum Reduced, 144 °F., S.P., 10 pen |  | 300 | 300 |  |  |
| Oil, 75–100 Furol Viscosity at 210° F |  |  |  | 100 |  |
| Oil, 150 Saybolt Viscosity at 210° F |  |  |  |  | 600 |
| Sodium Alkyl Aryl Sulfonate |  | 60 |  |  |  |
| Sodium Tallate | 60 |  | 60 | 60 | 60 |
| Mineral Spirits | 150 | 75 | 75 | 75 |  |
| Water | 200 | 300 | 300 | 300 | 150 |
| Total (Parts by weight) | 710 | 735 | 735 | 715 | 810 |

In the emulsion of Example XIV, the asphaltenes and oil were blended together before the mineral spirits was added. The resulting blend of asphaltenes and oils had a ring and ball softening point of 161° F.

Data from colloid mill runs using sodium tallate soap and cutback petroleum resins showing the effect of temperature on viscosity when the phase volume relationship is adjusted to obtain a maximum viscosity at selected temperatures of emulsification is shown below as Example XVI.

*Example XVI*

| Emulsification Temperature, ° F. | Viscosity of Emulsion in Centipoises | |
|---|---|---|
|  | at 5:1 phase volume ratio | at 6.8:1 phase volume ratio |
| 189 | 4,530 | 6,700 |
| 144 | 8,900 | 18,000 |
| 130 | 11,500 | 47,200 |
| 85 | 215,000 | 555,000 |

If the emulsification occurs at a particular phase volume ratio under conditions to give a maximum viscosity, then the viscosity at a particular temperature appears to be the same regardless of its temperature of emulsification. Also, the temperature determines the maximum phase volume ratio required to obtain a maximum viscosity and a minimum particle size.

The foregoing description of my invention is for the purpose of illustration and is not limiting to the scope thereof which is set forth in the claims.

I claim:

1. A bitumen-in-water emulsion characterized by an ability to size cellulosic products of a fibrous nature on the acid or alkaline side without the use of a setting aid, an ability to be diluted without creaming, and stability upon storing, the emulsion having as an emulsifying agent an organic emulsifier which promotes the formation of oil-in-water type emulsions selected from the class consisting of water soluble non-sulfo, detergent-forming, mono-carboxy acid soaps and water soluble metal organic sulfonates, an average particle size of less than 2 microns in diameter with substantially no emulsified particles of a diameter greater than 6 microns and the emulsion being produced by emulsifying the bitumen and water in the presence of the emulsifying agent by dispersing the bitumen in the water in a ratio to produce an emulsion having substantially the maximum viscosity for the bitumen in water system at the temperature of emulsification.

2. A petroleum bitumen-in-water emulsion characterized by an ability to size cellulosic products of a fibrous nature on the acid or alkaline side without the use of a setting aid, an ability to be diluted without creaming, and stability upon storing, the emulsion having as an emulsifying agent a water soluble soap of a non-sulfo, detergent-forming, mono-carboxy acid, an average particle size of less than 1 micron in diameter with substantially 99% of the particles being less than 4 microns in diameter and no particles larger than 6 microns in diameter, and the emulsion being produced by emulsifying the bitumen and water in the presence of the emulsifying agent by dispersing the bitumen in the water in a ratio to produce an emulsion having substantially the maximum viscosity for the bitumen-in-water system at the temperature of emulsification.

3. In a process for preparing a bitumen-in-water emulsion having as an emulsifying agent a water soluble organic emulsifier which promotes the formation of oil-in-water emulsions selected from the class consisting of water soluble non-sulfo, detergent-forming, mono-carboxy acid soaps and water soluble metal organic sulfonates, the improvement which comprises emulsifying the bitumen and water in the presence of the emulsifying agent by dispersing the bitumen in the water in a ratio providing an emulsion having substantially the maximum viscosity for the bitumen-in-water system at the temperature of emulsification, the resultant bitumen-in-water emulsion having an average particle size in the dispersed phase of less than two microns in diameter with substantially no particles in the dispersed phase of a diameter greater than six microns and being characterized by an ability to size cellulosic products of a fibrous nature on the acid or alkaline side without the use of a setting aid, an ability to be diluted without creaming, and stability upon storing.

4. The process of claim 3 wherein the bitumen is of petroleum origin.

5. In a process for preparing a bitumen-in-water emulsion having as an emulsifying agent a water soluble organic emulsifier which promotes the formation of oil-in-water emulsions selected from the class consisting of water soluble non-sulfo, detergent-forming, mono-carboxy acid soaps and water-soluble metal organic sulfonates, the improvement which comprises producing a preformed emulsion, the preformed emulsion being prepared by emulsifying the bitumen and water in the presence of the emulsifying agent by dispersing the bitumen in the water in a ratio providing an emulsion having substantially the maximum viscosity for the bitumen-water system at the temperature of emulsification, and then preparing additional emulsion while continuously maintaining the phase volume ratio of the bitumen-water system within the range yielding substantially a maximum viscosity for the bitumen-water system at the temperature of emulsification, the additional emulsion being prepared by introducing bitumen and water into the preformed emulsion in a ratio providing an emulsion having substantially the maximum viscosity for the bitumen-water system at the temperature of emulsification and emulsifying the bitumen and water in the presence of the emulsifying agent, the resultant bitumen-in-water emulsion having an average particle size in the dispersed phase of less than two microns in diameter with substantially no particles in the dispersed phase having a diameter greater than six microns and being characterized by an ability to size cellulosic products of a fibrous nature on the acid or alkaline side without the use of a setting aid, an ability to be diluted without creaming, and stability upon storing.

6. The process of claim 5 wherein the bitumen is of petroleum origin.

7. The process of claim 5 wherein the emulsifying agent is a water soluble soap of a non-sulfo, detergent forming, mono-carboxy acid.

8. A process for preparing a bitumen-in-water emulsion having as an emulsifying agent a water soluble organic emulsifier which promotes the formation of oil-in-water emulsions selected from the class consisting of water soluble non-sulfo, detergent-forming, mono-carboxy acid soaps and water soluble metal organic sulfonates, the emulsion having an average particle size in the dispersed phase of less than two microns in diameter with substantially no emulsified particles of a diameter greater than six microns and being characterized by an ability to size cellulosic products of a fibrous nature on the acid or alkaline side without the use of a setting aid, an ability to be diluted without creaming, and stability upon storing, which comprises producing a preformed emulsion, the preformed emulsion being prepared by emulsifying the bitumen and water in the presence of the emulsifying agent by dispersing the bitumen in the water in a ratio providing an emulsion having substantially the maximum viscosity for the bitumen-water system at the temperature of emulsification, creating a stream of the preformed emulsion, continuously introducing bitumen and water into the stream of preformed emulsion at a rate to continuously maintain the phase volume ratio of the bitumen-water system within the range yielding substantially a maximum viscosity for the system at its temperature, effecting turbulence in the stream, applying emulsifying agent to the stream of preformed emulsion prior to effecting turbulence, continuously withdrawing a portion of the stream subsequent to effecting turbulence, and providing the remainder as fresh preformed emulsion stream.

9. The process of claim 8 wherein the bitumen is of petroleum origin.

10. The process of claim 8 wherein the bitumen is of petroleum origin and the emulsifying agent is a water soluble soap of a non-sulfo, detergent-forming, mono-carboxy acid.

References Cited in the file of this patent

UNITED STATES PATENTS

| | | |
|---|---|---|
| 1,700,581 | Billinghame | Jan. 29, 1929 |
| 2,009,821 | Terrey et al. | July 30, 1935 |
| 2,087,400 | Fair | July 20, 1937 |
| 2,136,667 | Bert | Nov. 15, 1938 |
| 2,370,911 | Mayfield | Mar. 6, 1945 |
| 2,481,374 | Watts et al. | Sept. 6, 1949 |
| 2,819,228 | Dell | Jan. 7, 1958 |

OTHER REFERENCES

"Emulsions and Foams," by Berkman et al. (1941), Reinhold Pub. Co., New York, p. 21.